United States Patent [19]

Westerhausen

[11] 4,377,373

[45] Mar. 22, 1983

[54] WINDMILL

[75] Inventor: Robert Westerhausen, Milwaukee, Wis.

[73] Assignee: Wonder Wind Enterprises, Inc., Milwaukee, Wis.

[21] Appl. No.: 306,284

[22] Filed: Sep. 28, 1981

[51] Int. Cl.³ .............................................. F03D 3/06
[52] U.S. Cl. ................................ 416/197 A; 416/237; 416/DIG. 3
[58] Field of Search ............. 416/197 A, 237, DIG. 3

[56] References Cited

U.S. PATENT DOCUMENTS

| | | | |
|---|---|---|---|
| 998,889 | 7/1911 | Fraser | 416/237 |
| 2,996,120 | 8/1961 | McGregor | 416/237 B X |

Primary Examiner—Harvey C. Hornsby
Assistant Examiner—Arthur D. Dahlberg
Attorney, Agent, or Firm—Howard Olevsky

[57] ABSTRACT

A windmill blade system with two distinct blade ends with each comprising a center area having a series of identical projections equidistant from a central mounting orifice in the center area. Each of the projections consist of an upward and a downward facing triangle sharing a common base. When the blade units are combined by aligning the center areas of each, the triangles of the upper blade unit are above the plane formed by the center areas and the lower triangles of the lower base units are below that plane. With the lower blade unit projections forming a mirror image of the upper ones.

The invention also contemplates a windmill having at least one of the blade systems rotating horizontally about a vertical shaft.

4 Claims, 3 Drawing Figures

WINDMILL

FIELD OF THE INVENTION

This invention relates to a windmill blade system having a specific blade configuration and the windmill including this system.

BACKGROUND OF THE INVENTION

As a result of the steadily increasing cost of fossil fuels, the popularity of alternative energy sources has been steadily increasing.

One of these sources which is readily available is wind, and, indeed windmills have been used throughout the years to provide direct energy or energy which can be stored for later use.

Configurations for windmills have all suffered from disadvantages, however. Windmills which rotate vertically about a horizontal shaft tend to respond to directionally i.e. they are most efficient only when positioned in a certain orientation relative to the direction of the wind.

Windmill blades rotating horizontally about a vertical axis can be designed to eliminate this problem but these configurations are still susceptible to problems associated with wind force. High velocity wind flow tends to rotate the blades with sufficient force to tear the blade structure apart.

Also, sufficient wind force is necessary to cause rotation and low velocities tend to be unsuccessful in generating blade rotation.

Examples of blade configuration of the prior art can be found in U.S. Pat. Nos. 622,420; 603,703; 2,159,653; 2,419,384; 1,148,989 and 1,359,693.

U.S. Pat. No. 1,148,989 discloses a series of blades which are horizontally mounted and rotate vertically. These blades are positioned normal to the horizontal axis of the blade support and are generally triangular in configuration with a set of blades including an upper and a lower triangle. During rotation blades on one side of the axis are feathered into a central receiving area by complex mechanical means while the other blade set is operative.

U.S. Pat. No. 1,359,693 describes a pair of horizontally rotating blades formed as a section of a spiral. This patent discloses the concept of utilizing a bottom set of blades to catch wind spillage from an upper set of blades for increased efficiency.

SUMMARY OF THE INVENTION

This invention provides a windmill blade system which is easy to manufacture and operate, is highly efficient and responsive to only slight wind force but due to a self governing action built into its configuration.

A windmill blade system with two distinct blade ends with each comprising a center area having a series of identical projections equidistant from a central mounting orifice in the center area. Each of the projections consist of an upward and a downward facing triangle sharing a common base. When the blade units are combined by aligning the center areas of each, the triangles of the upper blade unit are above the plane formed by the center areas and the lower triangles of the lower base units are below that plane. With the lower blade unit projections forming a mirror image of the upper ones.

The invention also contemplates a windmill having at least one of the blade systems rotating horizontally about a vertical shaft.

The second or bottom blade unit acts to catch spilled air from the upper unit and the resultant configuration requires little wind force from any direction to power it. When high wind force is present the triangles of each unit tend to flatten providing for increased wind slippage without the generation of destructive force on the blade units or the windmill.

The design which allows for essentially constant blade unit rotation without excessive rotational speed allows almost constant power generation even in low wind force areas.

In order to provide sufficient flexibility and strength a lightweight metal such as aluminum or an aluminum alloy is preferred for blade construction.

DESCRIPTION OF THE DRAWINGS

This invention can be more readily understood by reference to the drawings in which.

Figure 1:
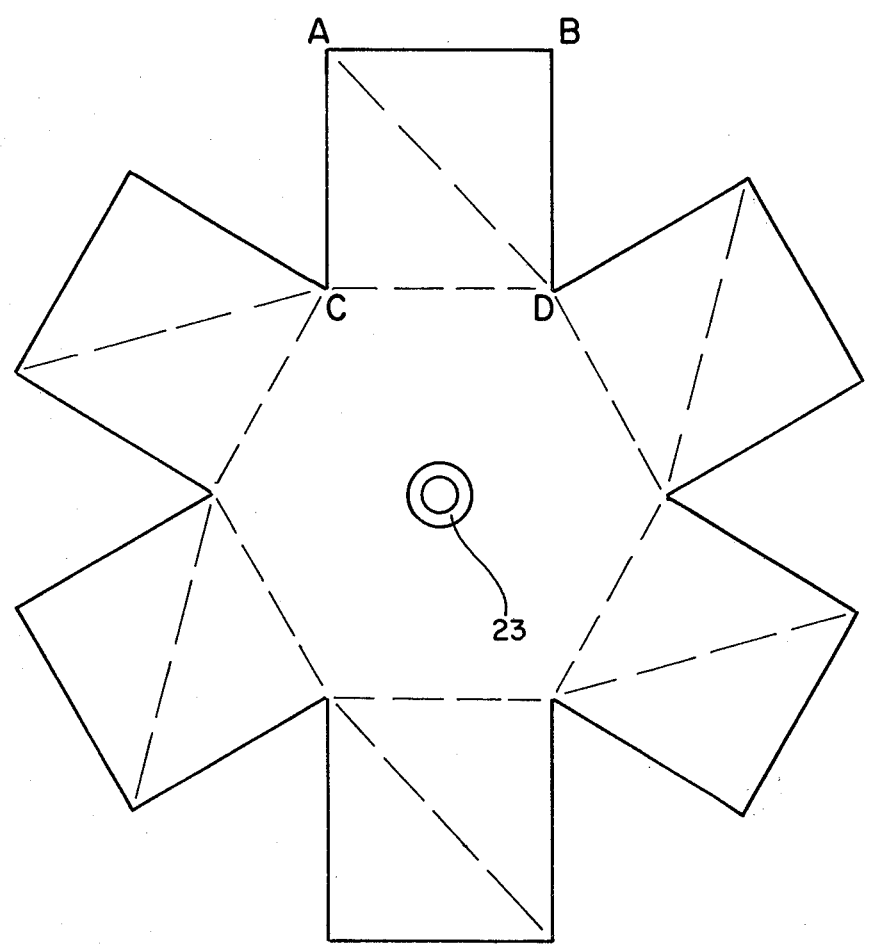
FIG. 1 is a plan view of a metal blank used to provide one of the blade units of this invention.

As can be seen from FIG. 1 a six-sided center area 18 is provided with a series of six adjacent rectangular projections 10 through 15 respectively. To make the blade unit of this invention each of the projections are folded along the bisecting fold line represented as A–D at projection 11 thereby forming an upper and a lower triangle A C D and A B D respectively with both of the triangles extending below the plane 18.

Figure 2:
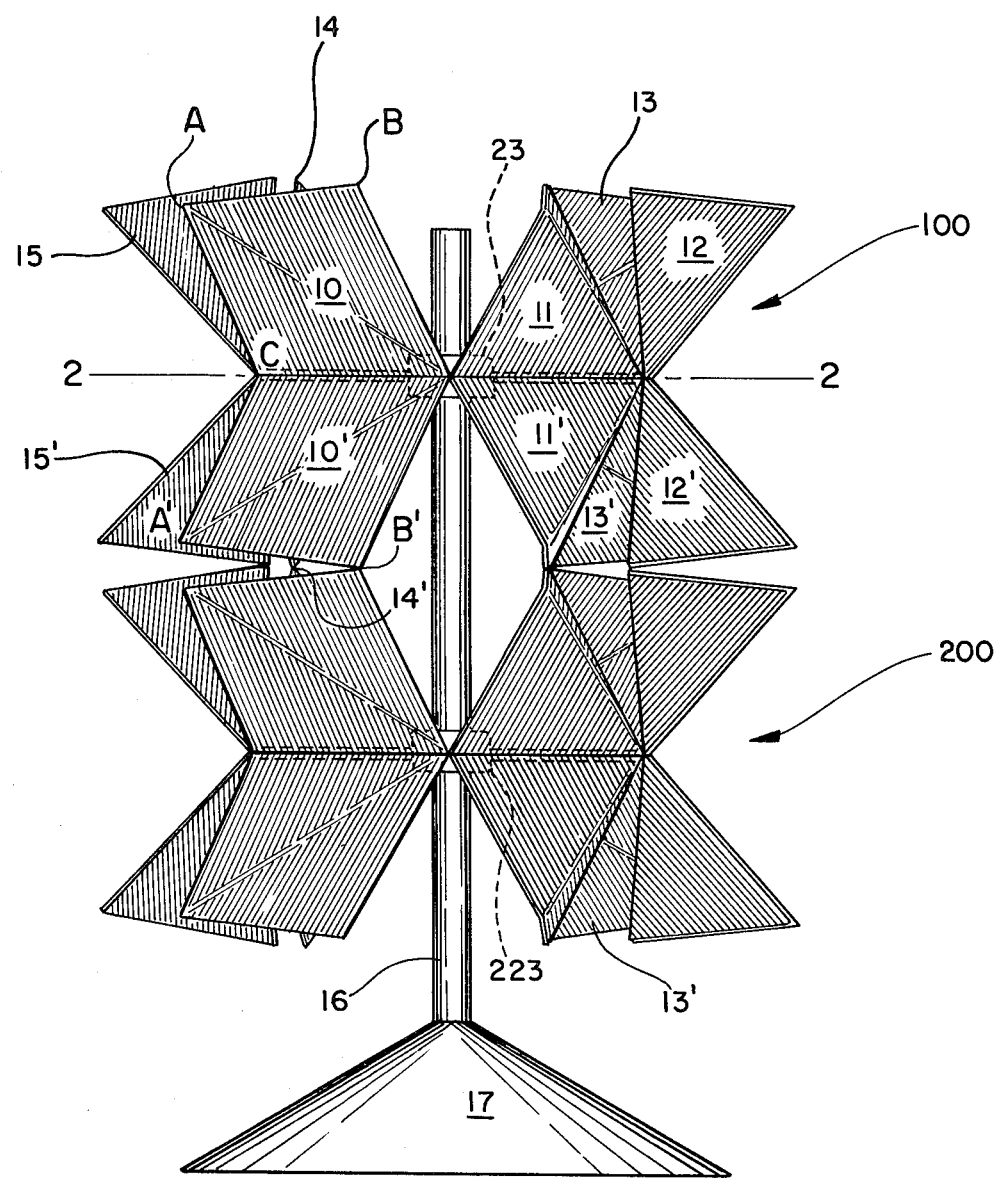
FIG. 2 is a perspective view of the blade system of this invention.

The orientation of these triangles can be more readily understood by reference to FIG. 2 in which the first blade unit is shown combined with a second blade unit. The location of the triangles A B D and A C D relative to each other and relative to the center portion 18 can be readily seen therein.

Figure 3:
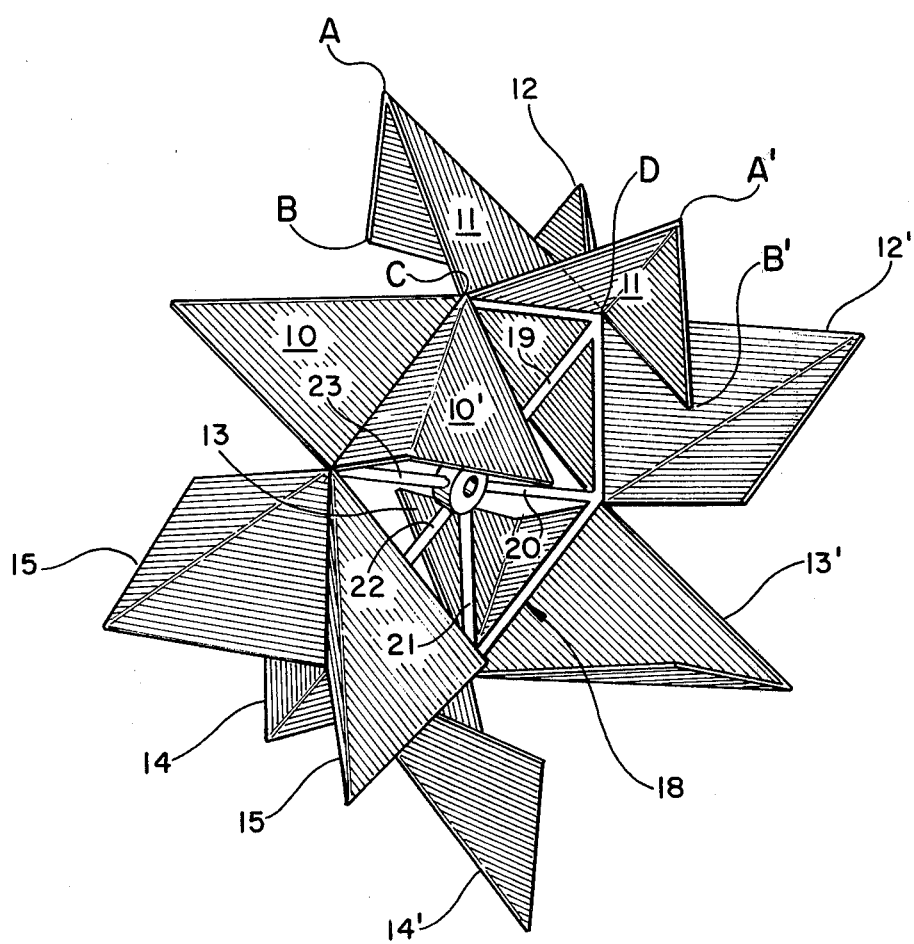
FIG. 3 is a front view of a windmill made according to this invention.

A second, matching blade unit is shown in FIGS. 2 and 3. As can be seen, this unit has essentially identical projections and triangles formed therefrom. When viewed along a plane denominated by line 2—2 in FIG. 3 the bottom directed projections formed by the second blade unit forms a mirror image of the top directed projections with both sets of triangles formed from each projection being located slightly upward and downward respectively of the plane formed by line 2—2.

The numbers and letters denominated by ' are in fact mirror images of the identical numbers. Therefore, projection 11' is the mirror image of projection 11 when viewed along line 2—2.

The embodiment depicted in FIG. 2 shows both sets of projections from each blade unit attached to circumferential ribs 18 which are, in turn braced and attached to central mounting hub 24 by ribs 19–24 respectively. (One of the supporting ribs is not shown in this projection.)

It should be noted that the center area for either of the blade units can be solid as shown in FIG. 1 or open as shown in FIG. 2 or one may be solid and the other open. It would also be possible to use one center for the upper and lower projections but while some material might be saved by this assembly, the manufacturing would appear to be substantially more complex.

A windmill built according to this invention is shown in FIG. 3. This Figure shows two stacked blade systems and this is contemplated as a feasible number for most situations although any number may be employed as desired.

What is claimed is:

1. A windmill blade system comprising in combination:

(1) a first blade unit having:

(a) a planar center area and a center mounting orifice; and (b) a series of projections extending equidistantly from said center point and from each other around the periphery of the center area each of said projections consisting of an upper and a lower triangle, each having an inner and an outer face and sharing a common base, the outward faces of each of said triangles being above the plane of the center area and the inward faces of said triangles defining an angle not greater than 90° as measured from a point on the common base line with each of said projections being essentially equal in size and configuration; and (2) a second blade unit having a center area equal in outer configuration and having projections identical to said first blade unit positioned adjacent to and inverse with said first base unit with each of the pairs of triangles on said second blade unit positioned below the plane of the center area of said second unit, said projections of said second blade unit forming a mirror image of said projection of said first blade unit when viewed on a plane extending from said center areas of said adjacent blade unit.

2. A windmill blade system according to claim 1 wherein at least one of the center areas consists essentially of a central core defining said mounting orifice and a series of ribs radially extending from said core to said projections.

3. A windmill blade system according to claim 1 wherein at least one of said center areas is solid except for said central mounting orifice.

4. A windmill comprising at least one windmill system according to claim 1.

* * * * *